United States Patent
Le et al.

(10) Patent No.: US 7,473,197 B2
(45) Date of Patent: Jan. 6, 2009

(54) TENSIONING RAIL APPLIED BY INJECTION MOLDING

(75) Inventors: Van T. Le, Erding (DE); Stefan Belmer, Anzig (DE); Alios Hinterstocker, Sauerlach (DE); Martin Bodensteiner, Erding (DE)

(73) Assignee: Joh. Winklhofer & Söhne GmbH und Co. KG, Munich (DE)

(*) Notice: Subject to any disclaimer, the term of this patent is extended or adjusted under 35 U.S.C. 154(b) by 421 days.

(21) Appl. No.: 10/862,613

(22) Filed: Jun. 7, 2004

(65) Prior Publication Data
US 2005/0054467 A1 Mar. 10, 2005

(30) Foreign Application Priority Data
Sep. 10, 2003 (DE) .................. 103 41 800

(51) Int. Cl.
*F16H 7/08* (2006.01)
(52) U.S. Cl. ..................................... 474/111
(58) Field of Classification Search ................ 474/101, 474/109, 110, 111, 140
See application file for complete search history.

(56) References Cited

U.S. PATENT DOCUMENTS

| | | | | |
|---|---|---|---|---|
| 3,802,286 | A * | 4/1974 | Winklhofer et al. | ......... 474/111 |
| 4,832,664 | A * | 5/1989 | Groger et al. | .............. 474/111 |
| 5,088,966 | A * | 2/1992 | Suzuki et al. | ............... 474/111 |
| 5,197,420 | A * | 3/1993 | Arnold et al. | ............. 123/90.15 |
| 6,139,454 | A * | 10/2000 | Simpson | .................... 474/110 |
| 6,205,965 | B1 * | 3/2001 | Stephan et al. | .......... 123/90.15 |
| 6,406,391 | B1 * | 6/2002 | Ullein | ....................... 474/101 |

FOREIGN PATENT DOCUMENTS

| | | |
|---|---|---|
| DE | 2525352 A1 | 12/1976 |
| DE | 4221138 A1 | 1/1994 |
| DE | 29500516 | 6/1996 |
| DE | 19650289 A1 | 6/1997 |
| DE | 19923905 A1 | 11/2000 |
| DE | 10123396 A1 | 2/2002 |
| DE | 10059119 A1 | 6/2002 |
| EP | 846891 A1 | 6/1998 |
| EP | 908646 A1 | 4/1999 |
| EP | 947731 A1 | 10/1999 |

\* cited by examiner

*Primary Examiner*—Vicky A Johnson
(74) *Attorney, Agent, or Firm*—Marshall, Gerstein & Borun LLP

(57) ABSTRACT

A method of producing a movable tensioning element of a tensioning device for tensioning flexible drive means, in particular for timing chain drives of internal combustion engines, the tensioning element having at least a tensioning piston and a tensioning rail made of a plastic material, with the tensioning rail being arranged on a tensioning end of the tensioning piston. A correspondingly implemented tensioning element as well as a tensioning device including such a tensioning element is provided. The method of producing the movable tensioning element includes placing the tensioning piston into an injection mold suitable for producing the tensioning rail; injecting the plastic material into the injection mold; encompassing the tensioning piston by the plastic material in certain areas thereof; and letting the plastic material solidify under formation of a positive connection between the tensioning piston and the tensioning rail.

7 Claims, 4 Drawing Sheets

TENSIONING RAIL APPLIED BY INJECTION MOLDING

FIELD OF INVENITION

The present invention relates to a method of producing a movable tensioning element of a tensioning device for tensioning flexible drive means, in particular for timing chain drives of internal combustion engines. In addition, the invention relates to a correspondingly implemented tensioning element as well as to a tensioning device including such a tensioning element.

BACKGROUND OF THE INVENTION

Tensioning devices for tensioning flexible drive means, especially those used in the case of timing drives of internal combustion engines, serve to maintain a certain chain or belt tension which changes due to wear of the drive means and when a change of the operating condition takes place during operation. In order to maintain the tension of the flexible drive means, the tensioning element of a tensioning device is guided in a housing such that it is movable relative to said housing.

Such a tensioning device comprising a tensioning element which is guided such that it is movable in the longitudinal direction is known e.g. from EP 947 731 A1. The tensioning element comprises here a tensioning piston which is arranged such that it is axially movable in a hole provided in the housing of the tensioning device and a guide shoe for guiding the drive chain of timing chain drive. The tensioning piston is provided with a mounting plate arranged on a tensioning end which is not guided in the housing, the tensioning shoe being clipped onto said mounting plate. The housing of this tensioning device has, on the side facing away from the tensioning element, a further guide section for guiding the drive chain. On the basis of this structural design it is possible to place this tensioning device between a timing chain drive and to guide the tensioned side as well as to tension the slack side of the timing chain drive.

DE 100 59 119 A1 shows a further embodiment of a tensioning element which is also applied to a tensioning piston that is guided in a housing in a longitudinally displaceable manner. The tensioning shoe has provided thereon two tongues which are formed integrally therewith and which are arranged in the longitudinal direction of the tensioning piston, said two tongues, in combination with a projection formed on the housing and a safety lock system, permitting the tensioning device to be arrested at a mounting position. The tensioning shoe and the tongues are preferably made of plastic material.

The tensioning elements and tensioning devices described at the beginning proved their worth in practical use, so did many other conventional structural designs. Especially with regard to the high number of pieces normally produced in the field of automobile industry, attempts are nevertheless continuously made to simplify the production or construction of components without restricting their functionality. Even a small reduction of costs in the production of components can, due to mass production, lead to a substantial saving of costs. Less complicated structural designs or production methods for components can, in addition, also lead to a reduction of the assembly expenditure or of the reject rate and can thus produce a further economizing effect.

SUMMARY OF THE INVETION

It is therefore the object of the present invention to provide a method of producing a movable tensioning element of a tensioning device of the type referred to above, which permits a reduction of costs due to simple production of the tensioning element.

According to the present invention, this object is achieved in one aspect by the following:
  placing the tensioning piston into an injection mold suitable for producing the tensioning rail;
  injecting the plastic material into the injection mold;
  encompassing the tensioning piston by the plastic material in certain areas thereof; and
  letting the plastic material solidify under formation of a positive connection between the tensioning piston and the tensioning rail.

This method according to the present invention permits a reasonably-priced production of tensioning elements during the injection molding process of the tensioning rail. By means of this method a direct connection between the tensioning rail and the tensioning piston can be established without any additional connection elements being required. This production method allows to dispense with certain mounting steps, such as the steps of pressing a fixing plate onto the tensioning piston and applying to such a fixing plate a tensioning rail which is normally produced from plastic material in an injection molding process, and to increase the degree of automation of the production. When a plurality of such operating steps is avoided, a substantial economizing effect can be achieved and possible sources of defects and rejects can be reduced.

Another embodiment is so conceived that, in the area enclosed by the tensioning rail, the tensioning piston is provided with formed elements, preferably with circumferentially extending grooves or flanges, that the formed elements are encompassed by or filled with the plastic material, and that the tensioning rail is connected to the tensioning piston in a non-releasable manner. The formed elements permit a reliable connection between the tensioning rail and the tensioning piston, and the fact that the formed elements are encompassed by or filled with the plastic material leads to a non-releasably connected component. It is therefore no longer necessary to check the connection between the tensioning rail and the tensioning piston, in contrast to conventional tensioning elements comprising a plurality of individual components.

The present invention additionally relates to a tensioning element for a tensioning device for tensioning flexible drive means, in particular for timing chain drives of internal combustion engines, said tensioning element comprising at least a tensioning piston and a tensioning rail made of a plastic material, and said tensioning rail being arranged on a tensioning end of the tensioning piston, the tensioning rail being applied by injection molding to the tensioning piston such that it is positively connected thereto. The positive connection established between the tensioning rail and the tensioning piston during injection molding leads to a component which can be produced at a reasonable price. The fact that the step of applying the tensioning rail to the tensioning piston and the step of producing the tensioning rail are combined allows closer tolerances for the tensioning element and, simultaneously, lower reject rates.

For establishing a reliable connection between the tensioning rail and the tensioning piston, the tensioning rail can be connected to the tensioning piston in a non-releasable manner. The risk that the tensioning rail may become detached from the tensioning piston during operation is thus reduced to an extremely low likelihood.

According to a preferred embodiment, the tensioning piston can comprise formed elements in the area of the tensioning rail, said formed elements being preferably circumferentially extending grooves or flanges. This simple structural design allows a reliable, preferably non-releasable positive connection between the tensioning rail and the tensioning piston.

An expedient embodiment of the tensioning element is so conceived that the tensioning rail has a vent hole which extends preferably coaxially with the tensioning piston and which communicates with a vent means of the tensioning piston. It is therefore not necessary to provide a complicated structural design for the vent means which is required in the case of a hydraulically operated tensioning device. It will be advantageous to arrange the outlet opening of the vent hole on the slideway which is contact with the flexible drive means. A suitable leakage flow will then allow a continuous lubrication of the timing chain drive.

In order to be able to save material, the tensioning rail can comprise an upper slide section and a lower rear section, and said upper slide section and said lower rear section can be interconnected by webs, the strength of the tensioning rail remaining, however, the same or being even improved. Large amounts of material can here be saved when a truss structure is used.

Another embodiment of the tensioning rail according to the present invention is so conceived that the tensioning rail comprises at least one guide arm which is arranged essentially axially parallel to the tensioning piston and which is formed integrally with said tensioning rail. Such a guide arm formed integrally with the tensioning rail by means of injection molding permits the tensioning rail to be secured against rotation relative to the tensioning-piston guide means in a simple manner and at a reasonable price. A structural design of the tensioning rail which is essentially adapted to the width of the drive means permits the tensioning element to be guided as precisely as possible with small radial tolerances.

For limiting the extension movement of the tensioning piston, the guide arm can comprise at least one end stop. That end stop can preferably be implemented as a projection on the guide arm, whereby a high degree of functional reliability as well as simple mounting of the tensioning element in a housing will be possible.

It will also be of advantage when, according to one embodiment, the guide arm comprises at least one arresting element. By means of such an arresting element, the tensioning element can easily be secured in position on a device for executing the final assembly in a reliable and simple manner. An arresting element of this kind is preferably implemented as an opening which cooperates in a simple manner with a removable securing pin and another arresting element.

In addition, the present invention relates to a tensioning device for tensioning flexible drive means, in particular for timing chain drives of internal combustion engines, said tensioning device comprising a housing and a tensioning element according to the present invention, the tensioning piston being guided in said housing in a longitudinally displaceable manner, and the tensioning rail being applied by injection molding to the tensioning piston such that it is positively connected thereto. Making use of this structural design, it is possible to provide a tensioning device which satisfies the high requirements to be fulfilled in an internal combustion engine and which is adapted to be produced at a reasonable price with a small number of production steps and a high degree of automation. Additional functional features of the tensioning device, e.g. the limitation of the extension movement of the tensioning piston and the protection of the tensioning rail against rotational displacement, can easily be integrated in the tensioning element produced by injection molding.

BRIEF DESCRIPTION OF THE DRAWINGS

Two embodiments of the tensioning element according to the present invention will be explained in detail making reference to the drawings, in which.

DETAILED DESCRIPRION OF THE INVENTION

Figure 1:
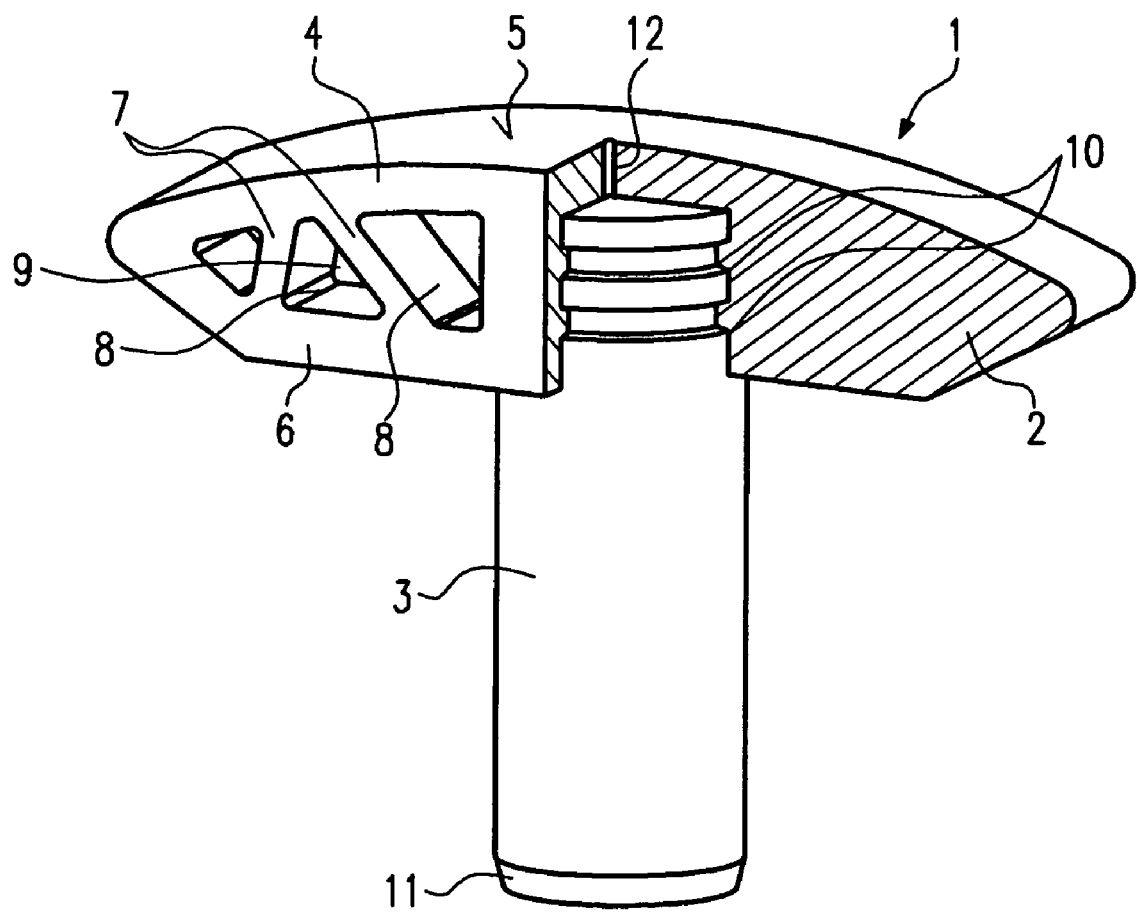
FIG. 1 shows a perspective side view of the tensioning element according to the present invention with a partially cut tensioning rail.

FIG. 1 shows an embodiment of a tensioning element 1 according to the present invention which comprises a tensioning rail 2 and a tensioning piston 3. The tensioning rail 2 is composed of an upper slide section 4 comprising a slideway 5 for guiding the flexible drive means and of a rear section 6. The slide section 4 and the rear section 6 are interconnected by a plurality of webs 7 extending at an oblique angle. By means of said webs 7 a plurality of windows 8 is defined between the slide section 4 and the rear section 6, said windows 8 being delimited by a middle wall 9 extending in the longitudinal middle plane of the tensioning rail 2. The cylindrical tensioning piston 3 has two annular, circumferentially extending grooves 10 which are provided in the area that is in contact with the tensioning rail 2 and which are filled completely by said tensioning rail 2. The associated front end of the tensioning piston 3 has a substantially closed structural design. The tensioning piston end located opposite the tensioning rail 2 is provided with a chamfer 11 permitting an unhindered movement into a precisely fitting opening. The tensioning rail 2 has a vent hole 12 which is located above the tensioning piston 3 and which establishes a connection between the tensioning piston 3 and the slideway 5. The vent hole 12 is arranged centrally on the tensioning rail 2 and extends coaxially with the tensioning piston 3.

Figure 2:
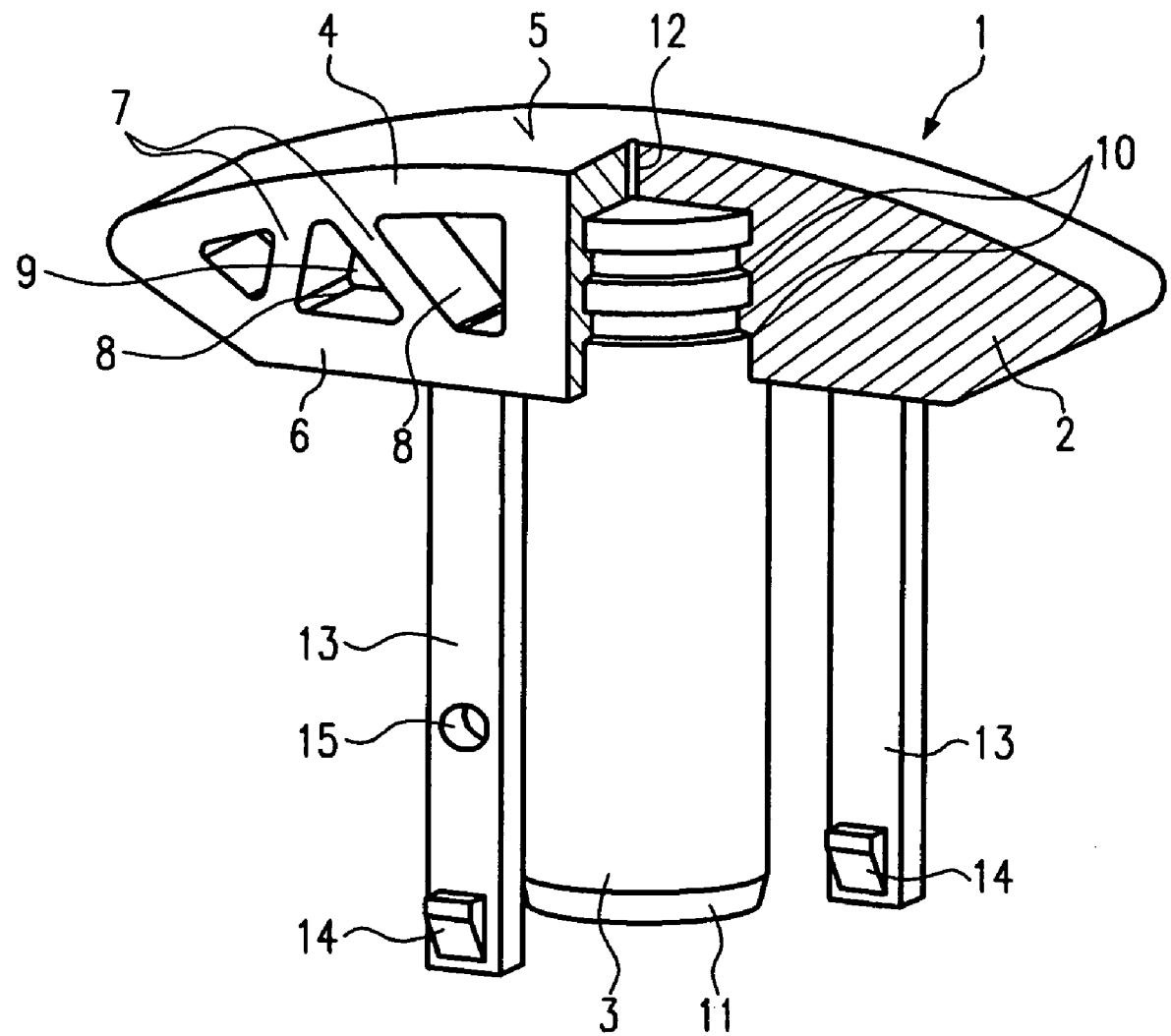
FIG. 2 shows a perspective side view of the tensioning element according to FIG. 1 with lateral guide arms.
Figure 3:
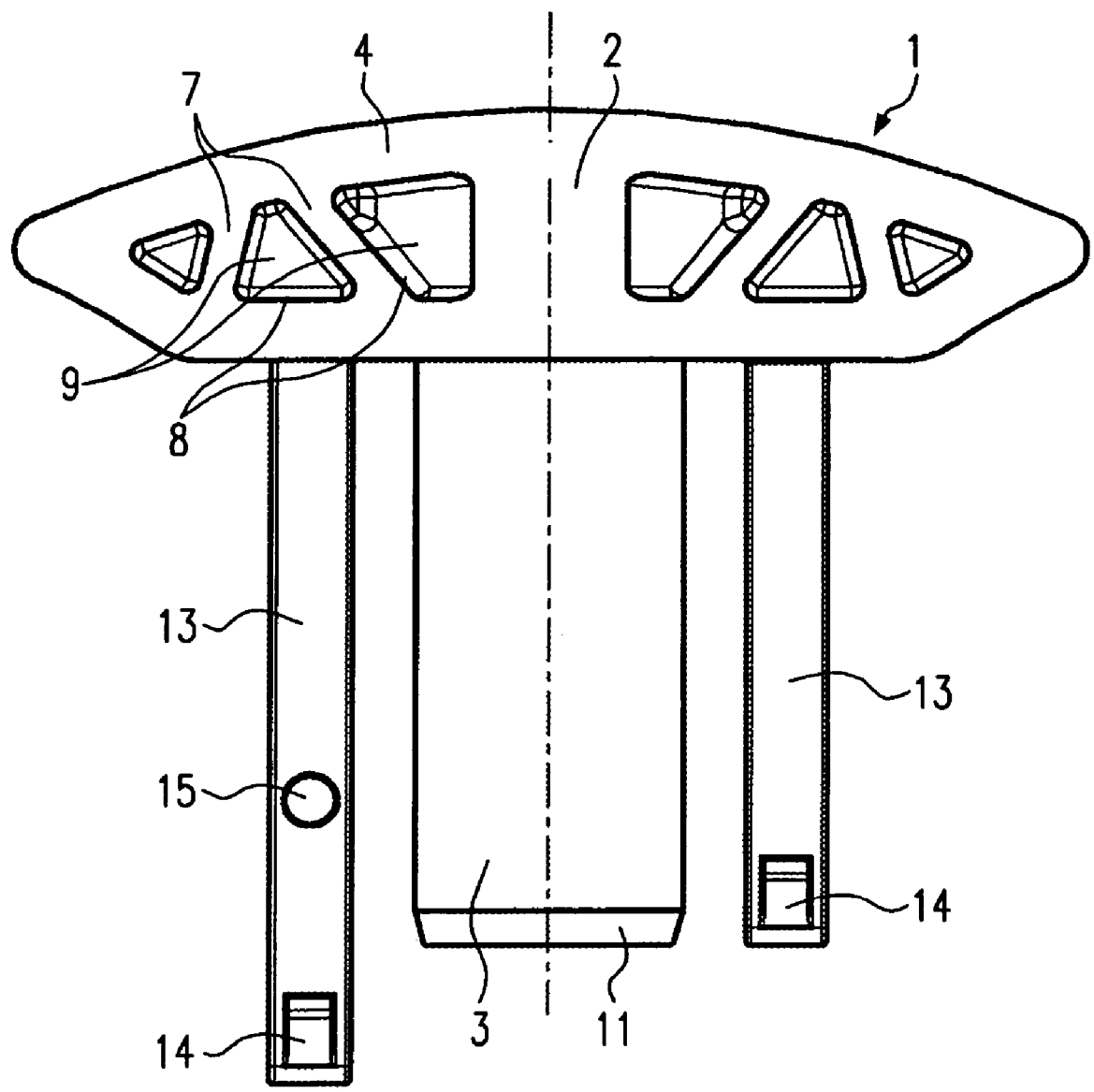
FIG. 3 shows a lateral top view of the tensioning element according to FIG. 2.

In the following, a further embodiment of a tensioning element will be explained in detail making reference to FIGS. 2 and 3. As far as the structural design of the components discussed is similar or identical to that of the preceding embodiment, these components will be referred to by the same reference numerals and by making reference to the above description. Hence, only the essential differences will be explained in the following.

This embodiment of the tensioning element has two guide arms 13 which are formed integrally with the tensioning rail 2 and which extend from the rear section 6 of said tensioning rail 2 in the direction of the free end of the tensioning piston 3. The guide arms 13 extend axially parallel to the tensioning piston 3. The guide arms 13 are preferably arranged on the same side of the longitudinal middle plane of the tensioning piston 3. On the respective free end located opposite to the tensioning rail 2, the guide arms 13 are each provided with a stop projection 14. One of said guide arms 13 includes an opening 15 which is provided between the rear section 6 and the stop projection 14 and through which a securing pin can be passed for arresting the tensioning element 1.

Figure 4:
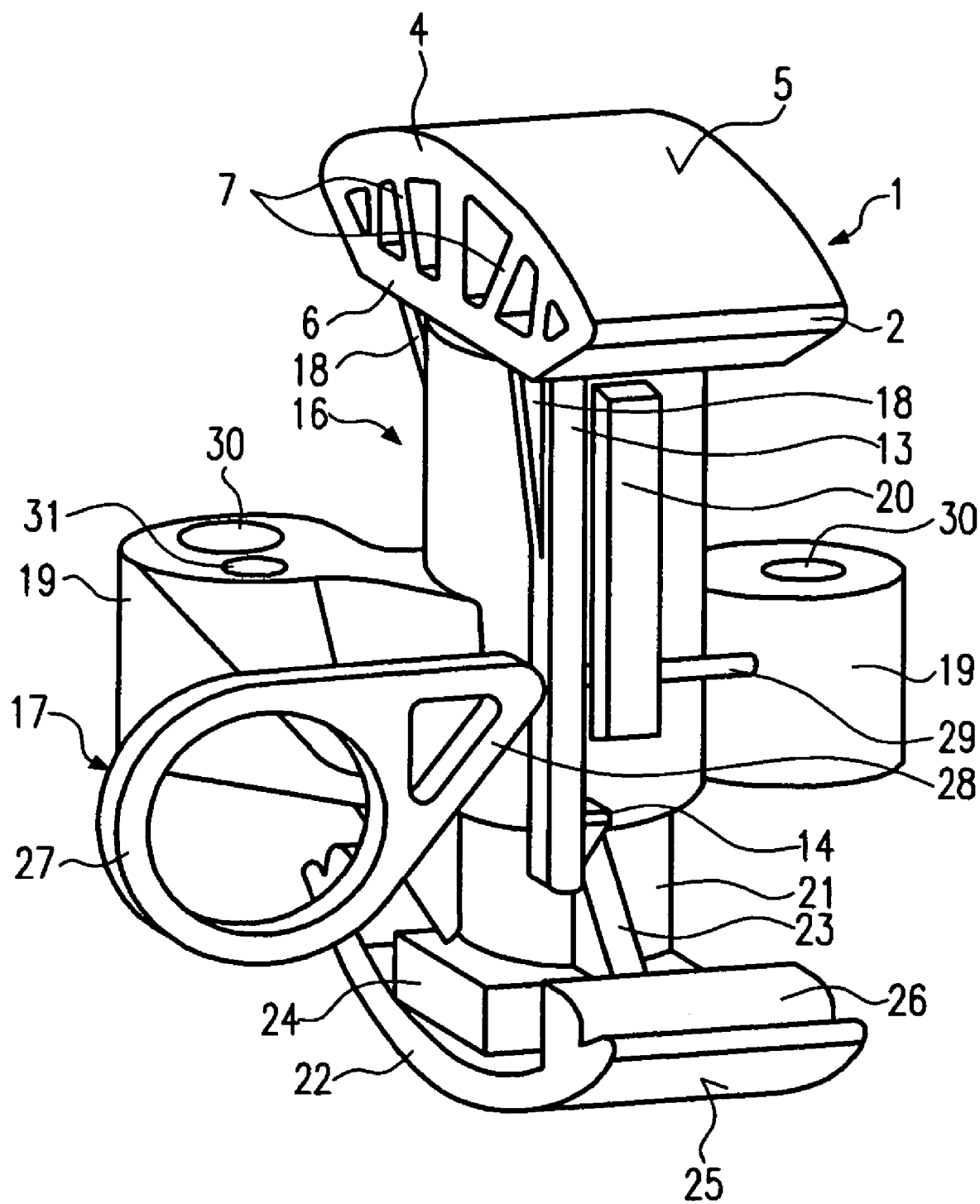
FIG. 4 shows a perspective side view of a tensioning device according to the present invention.

FIG. 4 shows an embodiment of a tensioning device according to the present invention, which comprises a tensioning element 1, a housing 16 and a safety lock system 17. The tensioning element 1 has essentially the same structural design as the above-described embodiment shown in FIG. 2 and FIG. 3; hence, only the differences will be explained in the following. The guide arms 13 of the tensioning element 1 are each provided with a lateral stiffening means 18 which extends from the respective guide arm 13 at an angle to the rear section 6 of the tensioning rail 2. The housing 16 comprises two lateral fastening sections 19, laterally projecting guide webs 20 which are formed axially parallel with the tensioning piston 3 that is displaceably arranged in the housing 16, a support section 21 and a slide element 22. The support section 21 is provided with two lateral stiffening means 23 which stabilize the connection between a slide element support 24 and the housing 16. The curved slide element 22, which is provided with the slideway 25 for guiding the flexible drive means, has at the outer ends thereof two pockets 26 which are engaged by the lateral end portions of the slide element support 24. The slideway 25 extends outwards beyond these pockets 26. The safety lock system 17 comprises, in addition to the annular handle 27, a reinforcement strut 28 and a securing pin 29. The safety lock system 17 is shown at its arresting position at which the securing pin 29 has been passed through the opening 15 in the guide arm 13 and through a further opening in the guide web 20, said further opening being not visible in this figure. Each of the fastening sections 19 of the housing 16 is provided with an opening 30 which serves to secure the tensioning device in position. One fastening section 19 includes, in addition to said opening 30, a hydraulic connection 31.

For producing the tensioning element 1 according to the present invention, a prefabricated tensioning piston 3 is placed in a suitable injection mold, the grooves 10 being located in the area of the tensioning rail 2 to be produced by injection molding. Subsequently, the injection mold is closed, at least the tensioning end of the tensioning piston 3 being then encompassed by the injection mold. Following this, a plastic material is injected into the injection mold. In the course of this process, the plastic material will encompass the tensioning end of the tensioning piston 3 provided with the grooves 10. With respect to the guide function which the tensioning rail 2 has to fulfill in contact with the flexible drive means, a wear-resistant plastic material with good strength properties will preferably be used. When the plastic material solidifies in the injection mold, a positively connected tensioning element 1 will form between the tensioning piston 3 and the tensioning rail 2.

For producing a tensioning device according to the present invention, a housing 16 is required in addition to a tensioning element 1 produced by injection molding; said housing 16 can be produced from a suitable plastic material, e.g. a fiber-reinforced thermosetting plastic, and it can be provided with a slide element 22 made of a wear-resistant material. For assembling the tensioning device, the tensioning element 1 with the tensioning piston 3 is inserted into an opening which is provided in the housing 16 and which is not visible in the figures, the guide arms 13 being moved past the guide webs 20. The guide arms 13 are under slight tension in the course of this process, since the stop projections 14 project relative to the guide-arm slide surface which is in contact with the guide web 20 during operation. When the guide arms 13 arrive at the lower end of the guide webs 20, said lower end serving simultaneously as a stop for the stop projections 14 of said guide arms 13, they will spring to their operating position, which prevents the tensioning rail 2 from being rotated relative to the housing 16 and which limits the extension movement of the tensioning piston 3. When the tensioning device is being assembled, the tensioning piston 3 is forced completely into the housing 16, with the exception of the portion connected to the tensioning rail 2, and at this position it is arrested by the safety lock system 17; for this purpose, the securing pin 29 is passed through the opening 15 in one guide arm 13 and the opening in the associated guide web 20, said openings being in alignment with one another at this position.

The thus assembled and arrested tensioning device is mounted in a timing chain drive of an internal combustion engine; at the end of the mounting operation of the timing chain drive, the safety lock system 17 will be removed and the tensioning device will thus be brought to the operating condition.

For fulfilling its function, viz. the tensioning of flexible drive means, the tensioning device according to the present invention comprises, in the interior of the housing, a pressure chamber in the interior of which the tensioning piston 3 is guided in a longitudinally displaceable manner, a spring for applying a pretension to the tensioning element 1, an inlet valve used for the hydraulic fluid and communicating with the hydraulic connection 31 and, normally, a vent and overflow hole, similar to the structural design of the tensioning device according to EP 947 731 A1 and DE 196 50 289 A1. The vent hole 12 in the tensioning rail 2 communicates with the vent and overflow hole in the hydraulic unit comprising the pressure chamber and the tensioning piston 3. During operation, the tensioning device according to the present invention produces a force which acts on the drive means and which is sufficiently strong for a reliable and silent operation of the timing drives of internal combustion engines. The stop at the lower end of the guide webs 20 limits, in combination with the stop projection 14 on the guide arm 13, the extension movement of the tensioning element 1. The guide webs 20 and the guide arms 13 are also in sliding contact with one another, whereby the tensioning element 1 can easily be moved out of the housing 16, whereas a rotation of the tensioning rail 2 relative to the housing 16 is prevented almost completely.

The invention claimed is:

1. A tensioning device for tensioning flexible drive means, comprising a housing (16), a tensioning element having at least a tensioning piston (3) with at least one circumferentially extending groove (10) and at least one circumferentially extending flange at a tensioning end and a tensioning rail (2) made of plastic material, wherein the tensioning rail, contacting and guiding the flexible drive means, is injection-molded to the tensioning end of the tensioning piston (3), and the tensioning rail (2) completely fills and surrounds the at least one circumferentially extending groove (10) and the at least one circumferentially extending flange, respectively, of the tensioning piston (3) such that the tensioning rail (2) is fixedly and form-fit connected to the tensioning piston (3), and wherein the tensioning piston (3) is guided in said housing (16) in a longitudinally displaceable manner.

2. A tensioning device according to claim 1, wherein the tensioning rail (2) has a vent hole (12) which extends preferably coaxially with the tensioning piston (3) and which communicates with a vent means of the tensioning piston (3).

3. A tensioning device according to claim 1, wherein the tensioning rail (2) comprises an upper slide section (4) and a lower rear section (6), and the upper slide section (4) and lower rear section (6) are interconnected by webs (7).

4. A tensioning device according to claim 1, wherein the tensioning rail (2) comprises at least one guide arm (13) which is arranged essentially axially parallel to the tensioning piston (3) and which is formed integrally with said tensioning rail (2).

5. A tensioning device according to claim 4, wherein the guide arm (13) comprises at least one end stop (14).

6. A tensioning device according to claim 4, wherein the guide arm (13) comprises at least one arresting element (15).

7. A tensioning device for tensioning flexible drive means, comprising:
    a housing (16);
    a tensioning element having at least a tensioning piston (3) with at least one of a circumferentially extending groove (10) and a circumferentially extending flange at a tensioning end; and
    a tensioning rail (2) made of plastic material, wherein the tensioning rail, contacting and guiding the flexible drive means, is injection-molded to the tensioning end of the tensioning piston (3), and the tensioning rail (2) completely fills and surrounds the at least one of the circumferentially extending groove (10) and the circumferentially extending flange, respectively, of the tensioning piston (3) such that the tensioning rail (2) is fixedly and form-fit connected to the tensioning piston (3), and wherein the tensioning piston (3) is guided in said housing (16) in a longitudinally displaceable manner.

\* \* \* \* \*